United States Patent

[11] 3,603,645

| [72] | Inventor | Donald Frederick Hardy<br>Horseheads, N.Y. |
|---|---|---|
| [21] | Appl. No. | 846,747 |
| [22] | Filed | Aug. 1, 1969 |
| [45] | Patented | Sept. 7, 1971 |
| [73] | Assignee | Dart Industries, Inc.<br>Los Angeles, Calif. |

[54] AIR SPEED ASSIST
5 Claims, 2 Drawing Figs.

[52] U.S. Cl. .................................................... 302/2,
198/160, 214/340
[51] Int. Cl. .................................................... B65g 47/26
[50] Field of Search ........................................ 198/160, 33
R; 214/1 AB; 302/2

[56] References Cited
UNITED STATES PATENTS
2,308,038  1/1943  Ashlock ..................... 214/1 AB UX
2,713,409  7/1955  Bartlett ..................... 214/1 AB UX
3,295,661  1/1967  Mitchell ..................... 198/33

*Primary Examiner*—Gerald M. Forlenza
*Assistant Examiner*—George F. Abraham
*Attorneys*—Leigh B. Taylor, Paul R. Wylie and Harold R. Beck ABSTRACT: A process and apparatus for assisting the motion of an article such as a bottle on a conveyor. The process comprises detecting when the article needs assistance and at that time directing an airstream at the article at an angle which will assist the article motion. The apparatus comprises an airstream directed at the article which will move the article in the direction of motion of the conveyor, a nozzle for directing the airstream, a valve for controlling the airstream, a detecting mechanism for determining when the bottle motion needs assistance and a relay between the detecting mechanism and the valve for opening the valve to permit the passage of air when the detecting mechanism determines that the motion of the article needs assistance.

PATENTED SEP 7 1971

3,603,645

INVENTOR.
DONALD F. HARDY

AIR SPEED ASSIST

BACKGROUND OF THE INVENTION

1. Field of Invention

This invention concerns a novel process and machine for assisting article motion on a conveyor and relates more particularly to a process and machine for assisting bottle motion on a conveyor to prevent slippage of the bottles.

2. Description of the Prior Art

In the prior art conveyors carried articles such as bottles without other assistance. Articles being carried by conveyors in the prior art without external assistance would occasionally slip on the conveyor causing collisions and irregular spacings. Collisions of articles such as bottles were a particular problem since scratches in the surface of the glass bottles might occur. When articles were removed from the conveyor to undergo a processing step, such as assembly or inspection, slippage would frequently occur between the article and conveyor as the article was replaced on the conveyor belt. This slippage caused a loss of time and the speed with which articles moved through the conveyor system was thereby reduced.

Few if any attempts were made in the prior art to correct the problem of article slippage on a conveyor. The industry as a whole did not seem to recognize that these problems, if not entirely, were in part due to article slippage on the conveyor. Bottle collision and irregular spacing was usually avoided by mechanically slowing the motion of the article upstream from the point of congestion Apparently it was not recognized in the prior art that article collision and irregular article spacing could also be avoided by speeding up the articles on the conveyor at the point of congestion.

It was known in the prior art that articles could be ejected from a conveyor line by blasting the article off the conveyor with a stream of compressed air. In the prior art the stream was always aimed directly at the article in the direction in which the article was to be ejected; however, in such cases the airstream was aimed directly at the centerline of the bottle or other article. A significantly higher air pressure was necessary to effect the bottle ejection than is needed to move the bottle in accordance with this invention.

BRIEF DESCRIPTION OF THE INVENTION

This invention relates to a process and apparatus for assisting motion of an article having a curved surface such as a glass bottle on a conveyor. The process comprises detecting when the article such as a glass bottle needs assistance and at that time directing an airstream at the article but at an angle which will assist the bottle motion. The apparatus comprises an airstream directed at the article which will move the article in a direction of motion of the conveyor, a nozzle for directing the airstream and an air supply attached to the nozzle for supplying the nozzle with compressed air. The apparatus may also include a valve for controlling the compressed air supplied to the nozzle, a detecting mechanism for determining when the bottle motion needs assistance and a relay between the detecting mechanism and the valve for opening the valve to permit the passage of air when the detecting mechanism determines that the article needs assistance.

An object of this invention is to provide a process and mechanism for overcoming article slippage on a conveyor.

Another object of this invention is to prevent collision of articles such as glass bottles being carried by a conveyor.

Another object of this invention is to prevent the irregular spacing of articles on conveyors.

Another object of this invention is to provide a process and apparatus for preventing bottle collision and irregular spacing while increasing the number of articles moved by the conveyor in unit measure of time.

Another object of this invention is to assist the motion of an article on a conveyor with a stream of compressed air.

Another object of this invention is to assist the motion of an article on a conveyor with a stream of compressed air having a lower pressure than would be necessary if the stream were aimed directly at the centerline of the article such as a glass bottle.

Further advantages of this invention will become more apparent from the incorporated text and drawings wherein.

PREFERRED EMBODIMENT

Figure 1:
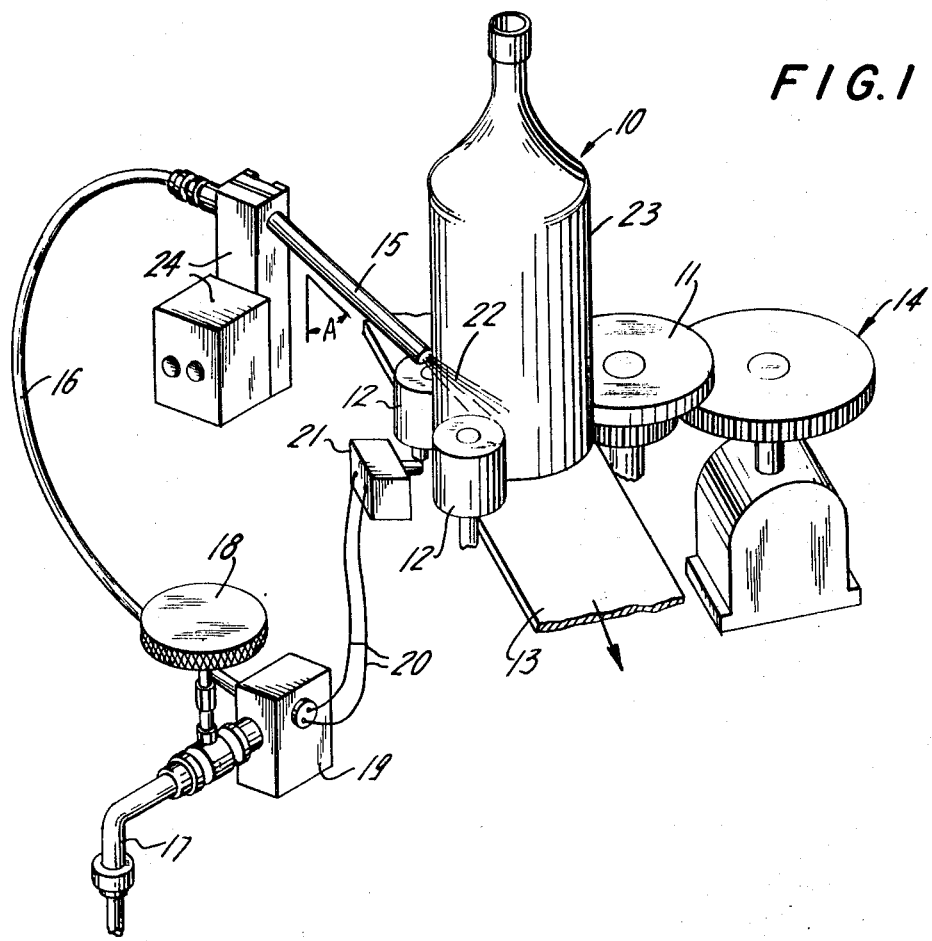
FIG. 1 is a perspective view of an apparatus to assist in the movement of articles with a conveyor.

In the preferred embodiment of the invention as is illustrated in FIG. 1, an article, for example bottle 10 is supported for movement on conveyor 13. As was previously indicated it is not uncommon in conveying mechanisms, such as is depicted, for the conveyed articles to be temporarily restrained either for the purpose of inspection, additional treatment, filling or other similar activity. Likewise, during such restraint the conveyor 13 normally will continue its forward movement. Thus, at the time of release the article may have a tendency to slip along the conveyor and sometimes substantial slippage will result. This slippage can further result in article breakage, scratching, irregular spacing and a reduced efficiency of the overall conveying system.

This particular arrangement shows an inspection station adjacent which the system assisting elements have been positioned. The forward motion of bottle 10 on conveyor 13 has been temporarily halted by the restrictive positioning of support rolls 12 with respect to drive roll 11. In this instance the rolls 12 are mounted for movement so that in their retracted position the conveyed article may freely pass the inspection area. However, at the discretion of an operator or upon a predetermined electrical signal or other mechanical activation these rolls are indexed so as to seize the bottle, etc., between themselves and drive roll 11. Subsequent to the seizure, drive roll 11 is activated by a drive means 14 which is shown to be a motor driven spur gear. This rotary movement enables a complete inspection of the article 10. It should be noted, however, that any suitable driving system may be employed in effectuation of the invention.

After inspection of the article 10 has been completed the supporting rolls 12 are retraced and the article is released for movement with the conveyor. This release is detected by a suitable detection means or detector such as a photo electric cell 21 that is positioned adjacent the inspection area. As mentioned it is at the time of release that slippage is most likely to occur and, therefore, it is logical to activate this air-assist mechanism upon such release. It is immaterial whether actual movement of the article 10 or some other element movement within the apparatus is sensed by the detection means 21.

The system assisting elements primarily include a compressed air supply (not shown), a control valve 18, solenoid valve 19 and a nozzle 15. These elements in cooperation with the detector 21 function to emit an intermittent airstream 22 upon the activation of detector 21. As can be seen with continued reference to FIG. 1, compressed air is conducted through conduit 17 from its source (not shown) and the rate of flow may be suitably controlled by a globe or similarly constructed valve 18. Likewise, this valve 18 functions as a shutoff valve for the compressed air source in the event that other elements in the system need repair or replacement. The airflow is further controlled by a solenoid actuated valve 19 which is electrically connected to the detector 21 so that upon activation of the latter the solenoid actuated valve will be momentarily opened to permit passage of air for a predetermined length of time. The air passed by the valve 19 is then transmitted to the nozzle 15 by an air hose 16. Nozzle 15 is positioned in a suitable mounting 24 and is directed at the front or downstream surface of the article 10.

Figure 2:
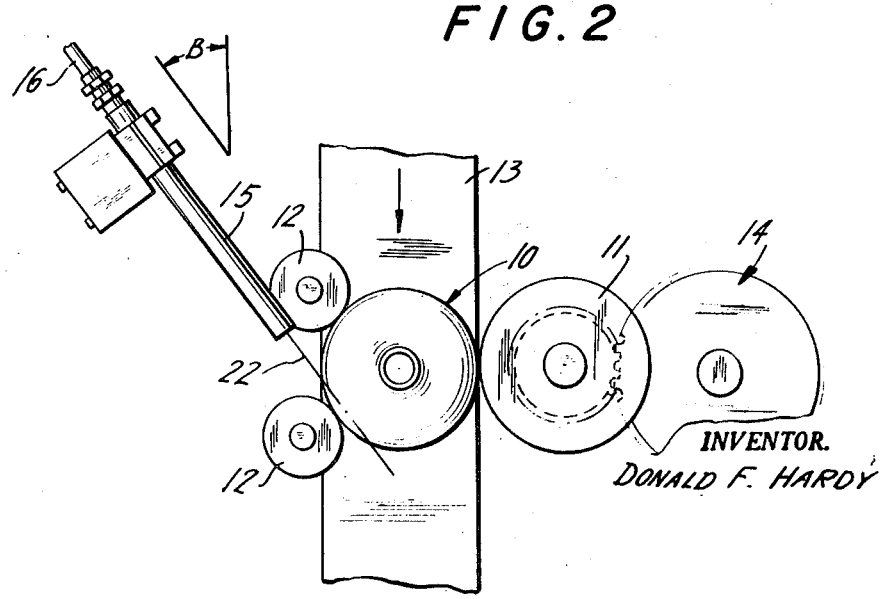
FIG. 2 is a plan view of portions of that assist apparatus.

Placement of the nozzle 15 is of particular import in that improved article movement may be obtained by angularly directing the airstream 22 at article 10. It is preferred that the angle A (FIG. 1) be from about 30° to about 80° with respect to the vertical and that the angle B (FIG. 2) be from about 30° to about 60° with respect to the centerline of the conveyor 13. Further, it should be apparent from the drawings that the nozzle 15 is positioned in close proximity to the article 10 so that the airstream 22 may effectively impinge upon its curved forward surface 23. It is theorized that the air stream 22 passing around the curved forward surface 23 creates a reduced pressure or partial vacuum in front of the article. This then acts like an airfoil and enables the higher pressure on the upstream side of the conveyor to assist in moving the article with the conveyor, thus reducing slippage between the two to a minimum.

The invention described above, of course, may be embodied in other specific forms without departing from the essential characteristics thereof.

What is claimed is:

1. An apparatus for assisting article motion on a conveyor comprising:
    conveyor means transporting a stream of articles along a path, a nozzle directing an airstream at the downstream surface of an article requiring assistance at an angle to create a low air pressure area so that upstream air pressure will move the article in the direction of motion of the conveyor,
    an air supply attached to said nozzle for supplying said nozzle with compressed air.

2. An apparatus for assisting article motion on a conveyor comprising:
    a nozzle for directing an airstream at the downstream surface of an article so as to create a low air pressure area so that upstream air pressure will move the article in the direction of motion of the conveyor,
    a tube attached to said nozzle for supplying compressed air to said nozzle,
    an air supply attached to said tube for introducing compressed air into said tube,
    a means for controlling the compressed air directed to said nozzle,
    a detecting mechanism interconnected with said control means for determining when article motion needs assistance, and
    a relay between said detecting mechanism and said control means for opening said control means to permit the passage of air when said detecting mechanism detects that article motion needs assistance.

3. An apparatus for assisting bottle motion along a conveyor comprising:
    a nozzle positioned behind the front surface of said bottle for directing an airstream at the front surface of said bottle at an angle of from about 10° to 60° from the horizontal and at an angle of from about 30°–60° from the centerline of the conveyor,
    a tube attached to said nozzle for supplying compressed air to said nozzle,
    a means for controlling the compressed air to said nozzle,
    a detecting mechanism interconnected with said control means for determining when bottle motion needs assistance, and
    a relay between said detecting mechanism and said control means for opening said control means to permit the passage of air when said detecting mechanism detects that bottle motion needs assistance.

4. A process for assisting the motion of a bottle along a conveyor comprising:
    detecting when said bottle needs assistance, and
    directing an airstream at the downstream surface of said bottle at an angle to form a low pressure area so that upstream air pressure will assist the bottle when the need for assistance is detected.

5. The process of claim 4 wherein said angle is from about 10° to 60° from the horizontal and from about 30° to about 60° from the centerline of the conveyor.